United States Patent [19]
Kline

[11] 4,031,953
[45] June 28, 1977

[54] HEAT EXCHANGER SYSTEM AND DUCTING ARRANGEMENT THEREFOR

[75] Inventor: Jan C. Kline, Brimfield, Ill.
[73] Assignee: Caterpillar Tractor Co., Peoria, Ill.
[22] Filed: Dec. 23, 1974
[21] Appl. No.: 535,877
[52] U.S. Cl. .................. 165/166; 60/39.51 R; 62/90; 165/52; 165/66; 165/126; 165/143
[51] Int. Cl.² ............. F02C 7/10; F02G 1/00; F28F 9/26; F28F 3/08
[58] Field of Search ............... 62/90; 165/143, 144, 165/126, 166, 52, 66; 60/39.51 R

[56] References Cited
UNITED STATES PATENTS

| | | | |
|---|---|---|---|
| 2,124,787 | 7/1938 | Lachasse | 165/144 |
| 2,856,161 | 10/1958 | Flynn | 165/129 |
| 3,716,097 | 2/1973 | Kelp et al. | 165/126 X |
| 3,752,226 | 8/1973 | Bullock | 165/126 X |
| 3,759,323 | 9/1973 | Dawson et al. | 165/166 |
| 3,817,708 | 6/1974 | Vernon | 165/143 X |
| 3,866,674 | 2/1975 | Tramuta et al. | 165/145 X |

Primary Examiner—C. J. Husar
Assistant Examiner—Sheldon Richter
Attorney, Agent, or Firm—Charles E. Lanchantin, Jr.

[57] ABSTRACT

A heat exchanger system and ducting arrangement therefor includes a pair of heat exchanger units defining an elongated space between them, and individually having a first fluid flow path and a second fluid flow path therethrough for transferring heat from a relatively hot fluid to a relatively cool fluid, a bifurcated inlet channel for delivering the hot fluid to the heat exchanger units, a pair of exhaust conduits for conducting the hot fluid away from the heat exchanger units after heat is extracted therefrom during its travel through the first fluid flow paths, an elongated duct for delivering the cool fluid to the elongated space and from there oppositely outwardly to the heat exchanger units, and a pair of outlet manifolds for conducting the relatively cool fluid away from the heat exchanger units after it is beneficially heated during its travel through the second fluid flow paths.

2 Claims, 4 Drawing Figures

HEAT EXCHANGER SYSTEM AND DUCTING ARRANGEMENT THEREFOR

BACKGROUND OF THE INVENTION

Heat exchangers for transferring heat from one fluid to another, such as from hot engine exhaust gas to relatively cool combustion air, are being continually developed in order to reduce the fuel consumption of the overall power plant with which they are operatively associated. Particularly active is the program to develop a gas turbine engine and heat exchanger package which can more economically and more effectively produce useful power. An example of such a package is disclosed in U.S. Pat. No. 3,759,323 issued Sept. 18, 1973 to H. J. Dawson et al and assigned to the assignee of the present invention.

While otherwise being operationally satisfactory, the heat exchanger and gas turbine engine package of the aforementioned U.S. Pat. No. 3,759,323 is somewhat bulky, which is undesirable for its use in an earthmoving vehicle or the like where space is at a premium. Particularly, the referenced package is too tall because the ducting used therein utilizes part of the package height for lengthwise distribution of the cool fluid to the side-by-side heat exchanger units.

When the length and width of the heat exchanger units and their associated ducting are limited so that these components do not extend outwardly to any significant degree beyond the gas turbine engine table-top area, certain performance characteristics are adversely limited. For example, minimizing the size of the triangular-shaped cross-flow zones with respect to the size of the rectangular counterflow area is important to effective performance. Hence, the package size must also be chosen with this in mind, and with an appreciation of the overall complexity and expense of the associated ducting, which ducting may also serve to support the heat exchanger units.

SUMMARY AND OBJECTS OF THE INVENTION

It is therefore an object of the present invention to provide a relatively more compact and economical heat exchanger system and ducting arrangement therefor.

Another object of the present invention is to provide such a heat exchanger system and ducting arrangement particularly adaptable for intimate mounting on a gas turbine engine generally within the area above it.

Another object of the present invention is to provide an operationally effective heat exchanger system and ducting arrangement of the character described which utilizes a pair of elongated side-by-side heat exchanger units.

Other objects and advantages of the present invention will become more readily apparent upon reference to the accompanying drawings and following description.

DESCRIPTION OF THE PREFERRED EMBODIMENT

Figure 1:
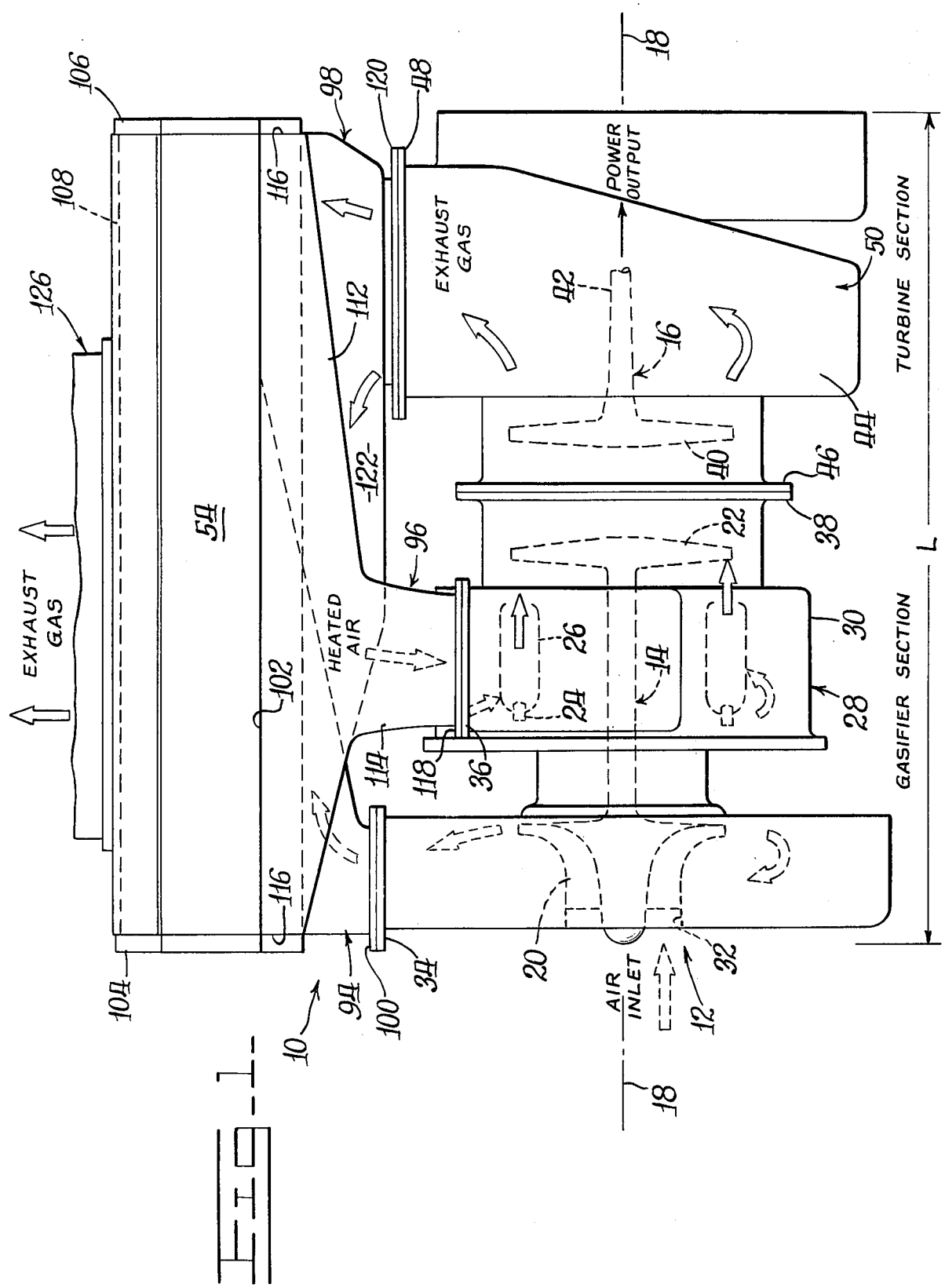
FIG. 1 is a side elevational view of the heat exchanger system and ducting arrangement of the present invention showing its intimate mounting on a gas turbine engine and the fluid flow paths associated therewith.
Figure 2:
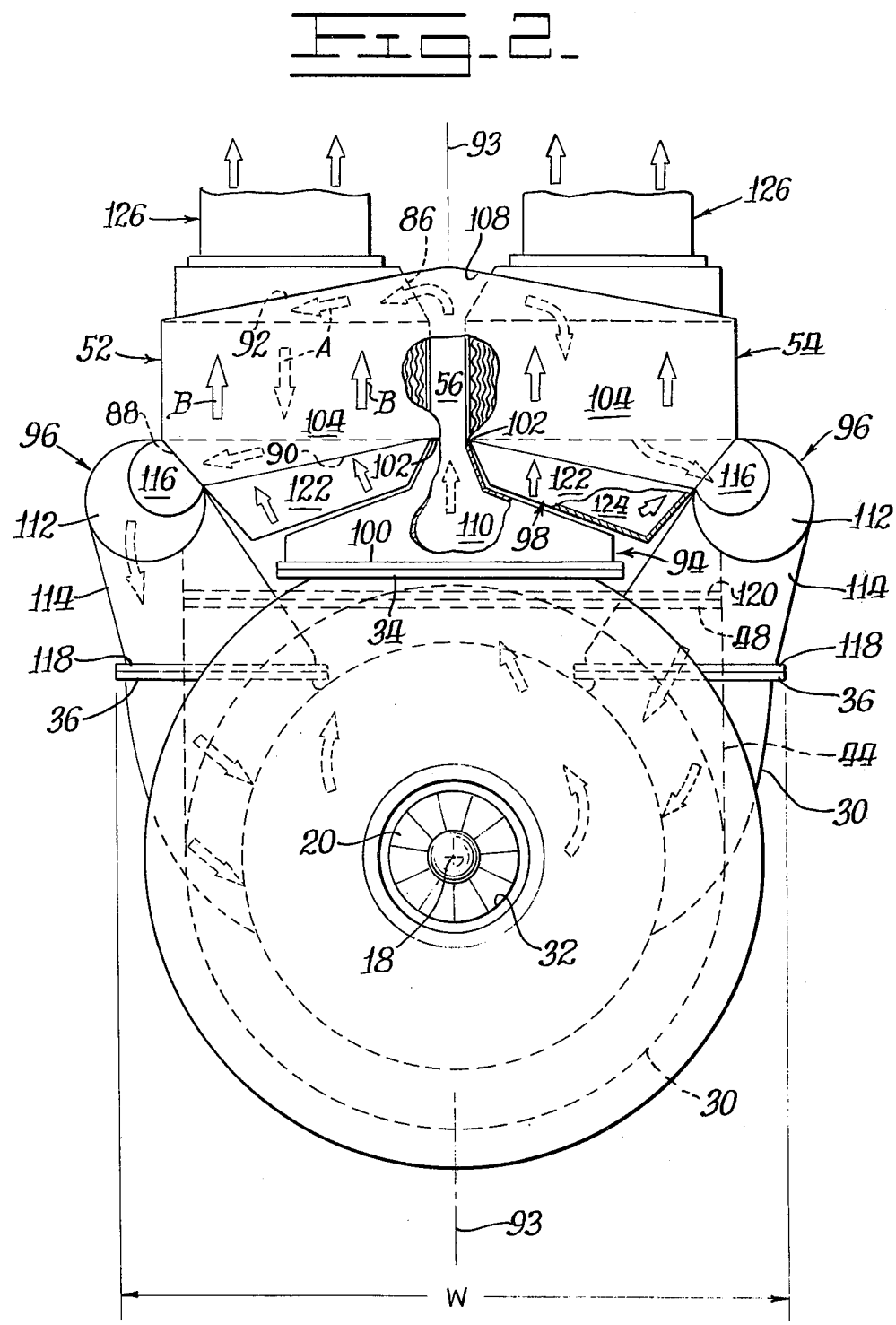
FIG. 2 is a front elevational view of the heat exchanger system and ducting arrangement shown in FIG. 1 with portions broken open to better illustrate the fluid flow paths associated with the side-by-side heat exchanger units.

With reference to FIGS. 1 and 2, the heat exchanger system and ducting arrangement 10 of the present invention is shown in an intimately mounted and supported relation on a gas turbine engine 12. In the current example, the gas turbine engine has a front shaft assembly 14 and a rear shaft assembly 16 somewhat schematically illustrated in broken lines which are arranged in end-to-end alignment along a central longitudinal axis 18 of the gas turbine engine. The rotatable front shaft assembly includes a compressor portion 20 and an integrally associated gasifier turbine portion 22 for driving it, so that with the addition of a fuel injector 24 and a combustion chamber 26 these members operationally cooperate in the usual manner to define a gasifier section 28. The gasifier section further includes a front housing 30 for supportably containing the front shaft assembly and for appropriately directing the air and gases therethrough. As is also shown in FIG. 2, this housing has a front air inlet opening 32, a combined upper front mounting flange and compressed air outlet opening 34, and a symmetrically laterally spaced pair of combined upper rear mounting flanges and heated air inlet openings 36. The housing further has a combined rear mounting flange and gas outlet opening 38 as best shown in FIG. 1.

Similarly, the rear of the gas turbine engine 12 includes the rear shaft assembly 16 having a power turbine portion 40 and an integrally associated output shaft 42 which drives a suitable load. The rear shaft assembly is supportably contained within a rear housing 44 having a combined front mounting flange and hot gas inlet opening 46 which is removably and alignably secured to the combined rear mounting flange and gas outlet opening 38 of the gasifier section 28, and also having a combined upper rear mounting flange and exhaust gas outlet opening 48. Such rear housing and its corresponding rotating shaft assembly also cooperate in the usual manner to generally establish a turbine section 50.

More particularly, the heat exchanger system and ducting arrangement 10 of the present invention includes a side-by-side pair of elongated heat exchanger units 52 and 54 which are longitudinally arranged in substantially parallel laterally spaced relation to define an elongated space transversely between them as indicated generally by the reference numeral 56 in FIG. 2. Each of these units consists essentially of a stack of upright, primary surface, heat exchanging plate assemblies 58 and 60 which are alternately arranged in transversely oriented juxtaposed relation as better illustrated by the exploded isometric view thereof in FIG. 3, each of the plate assemblies 58 includes a heat transferring profiled sheet 62 having a corrugated central rectangular area 64 which is flanked by a pair of slightly obliquely corrugated or otherwise profiled triangularly-shaped zones 66 and 68. A pair of edge bars 70 and 72 are attached to one surface of the sheet 62 at substantially the opposite sides thereof for spacing the plate assemblies apart, as well as for sealing the edges thereof in order to prevent leakage and intermixing of the fluids passing through the heat exchanger units. In a similar manner the alternating plate assemblies 60 individually include a profiled sheet 74 having a corrugated central rectangular area 76 which is flanked by a pair of relatively markedly obliquely corrugated triangularly-shaped zones 78 and 80 so that the rectangular areas and triangularly-shaped zones of each of the plate assemblies are generally disposed in cooperatingly aligned juxtaposed relation. A pair of edge bars 82 and 84 are likewise secured on the appropriate opposite side edges of the sheet 74 so that when the plate assemblies are alternately stacked together those peripheral portions not sealed by the edge bars provide substantially opposite and cooperating apertures 86 and 88, and 90 and 92. Thus, the plurality of longitudinally aligned and alternatingly arranged apertures 86 and similarly oppositely aligned apertures 88 respectively allow ingress and egress of relatively cool air, while the apertures 90 and 92 respectively allow ingress and egress of relatively hot gas. The construction of the individual heat exchangers 52 or 54 is somewhat similar to that disclosed in U.S. Pat. No. 3,759,323 mentioned above, as well as in U.S. Pat. No. 3,291,206 issued Dec. 13, 1966 to T. P. Nicholson. Other heat exchanger constructions may also be utilized in the present invention.

Beneficially, the heat exchanger units 52 and 54 of the present invention are symmetrically arranged in laterally spaced relation on the opposite sides of a vertical plane 93 passing through the longitudinal axis 18 of the gas turbine engine 12 as best shown in FIG. 2. As shown in both FIGS. 1 and 2 these side-by-side heat exchanger units are supported in such positions by a centrally disposed elongatably tapered air inlet duct 94, a pair of air outlet manifolds 96 disposed at the opposite sides thereof, and a bifurcated channel and wall member 98 generally longitudinally arranged between them.

The air inlet duct 94 of the present invention is beneficially symmetrically and centrally arranged with respect to the vertical plane 93, and includes a mounting flange and air inlet opening 100 at the lower portion thereof which is removably and alignably secured to the mounting flange 34 of the front housing 30. At an upper edge 102 thereof the air inlet duct is sealingly secured to the heat exchanger units 52 and 54 so that it is in open communication with the elongated space 56 between them. A pair of end walls 104 and 106 bridgingly span the opposite ends of the heat exchanger units, and an elongated cover 108 spans between the upper inner portion of both heat exchanger units, to thereby define with the air inlet duct an air inlet plenum 110 inclusive of the elongated space 56. This air inlet plenum is in open communication with the air inlet apertures 86 mentioned previously above.

As best shown in FIG. 2 the air outlet manifolds 96 are also preferably symmetrically arranged with respect to the vertical plane 93 along the outer lower side portions of the heat exchanger units 52 and 54. The manifolds individually include an inwardly facing, arcuately-shaped curved wall portion 112 convergingly tapering from a substantially centrally disposed upright tubular portion 114 longitudinally outwardly towards a pair of opposite end walls 116. While such wall portions and opposite end walls are sealingly secured to the heat exchanger units so that the interior of the manifolds are in open communication with the air outlet apertures 88, the tubular portion of each manifold includes a base mounting flange and air outlet opening 118 which is removably secured in aligned abutting relation to the individual mounting flanges 36 of the front housing 30.

In a somewhat similar manner the rear portion of each of the heat exchanger units 52 and 54 is supported on the rear housing 44 through the bifurcated channel and wall member 98. Such member includes a mounting flange and exhaust gas inlet opening 120 which is alignably secured to the mounting flange 48 of the housing. It also is substantially symmetrically arranged on opposite sides of the vertical plane 93, and includes a pair of forwardly extending channels 122 which taper convergingly upwardly towards the front of the heat exchanger units in a generally straddling relation with respect to the air inlet duct 94. Further, the member is sealingly secured to the bottom of the units to define therewith a bifurcated exhaust gas plenum 124 as best shown in FIG. 2. This exhaust gas plenum permits open communication of the exhaust gases from the turbine section 50 with the gas inlet apertures 90 of both heat exchanger units.

In addition to the aforementioned ducting, a pair of exhaust conduits 126 are individually secured to the heat exchanger units 52 and 54 at the upper portion thereof and which are in open communication with the gas outlet apertures 92 to conduct exhaust gases upwardly away from the units.

OPERATION

While the construction and operation of the present invention is believed clearly apparent from the foregoing description, further amplification will subsequently be made in the following brief summary of such operation. For continuity, the flow path of the relatively hot engine exhaust gas is indicated on the drawings by solid line arrows, while the flow path of the relatively cooler air is indicated by broken line arrows.

Referring to FIGS. 1 and 2, the gasifier section 28 of the gas turbine engine 12 cooperates with the turbine section 50 and heat exchanger system and ducting arrangement 10 of the present invention in the following manner. With rotation of the front shaft assembly 14 the compressor portion 20 draws air axially through the inlet opening 32 into the housing 30 and discharges pressurized and somewhat heated air into the air inlet duct 94 and the air inlet plenum 110. From an upper central position within substantially the full length of the air inlet plenum the compressed air travels transversely oppositely outwardly to enter the heat exchanger units 52 and 54. Specifically, the air enters the plurality of individual apertures 86 between the stacked plate assemblies 58 and 60, respectively, where it is heated as it travels therethrough along a generally Z-shaped flow path as indicated by the broken line arrows identified by the letter A on FIGS. 2 and 3. After being heated the air passes substantially longitudinally outwardly through the opposite apertures 88 where it is collected by the air outlet manifolds 96. From there the heated air is directed downwardly at the opposite outer sides of the heat exchanger units into the front housing 30 where it is fed to the combustion chamber 26.

As best shown in FIG. 1, either gaseous or liquid fuel is added by the fuel injector 24 to the beneficially heated and compressed air at the front of the combustion chamber 26. The subsequent gaseous products of combustion, shown hereinafter as solid line arrows, are allowed to flow axially rightwardly when viewing the drawing to impinge on and to powerably drive the gasifier turbine portion 22. Thus, the expanding gas serves to initially rotate the gaifier turbine portion to drive the integrally associated compressor portion 20. Thereafter, the expanding gas travels further rightwardly from within the front housing 30 to the rear housing 44 where it impinges on and powerably drives the power turbine portion 40 which subsequently delivers useful power to any applied load via the output shaft 42. Still further, the exhaust gas can be effectively utilized to heat air, or even liquids, through an associated exhaust heat exchanger system. In the instant example the gas travels generally upwardly through the heat exchanger units 52 and 54.

Specifically, the exhaust gas provides useful energy recovery by passing upwardly from within the rear housing 44 into the exhaust gas plenum 124 as directed by the bifurcated channel and wall member 98. From there it travels generally upwardly into the plurality of longitudinally aligned apertures 90 defined between the heat exchanger plate assemblies 58 and 60. Such relatively hot exhaust gas transfers heat to the sheets 62 and 74 while traveling generally upwardly through both heat exchanger units 52 and 54 in a substantially straight-through pattern as indicated by the solid line arrows identified by the letter B in both FIGS. 2 and 3. Thereafter the exhaust gas continues upward movement outwardly from the apertures 92 and is delivered by the exhaust conduits 126 to the atmosphere.

Figure 3:
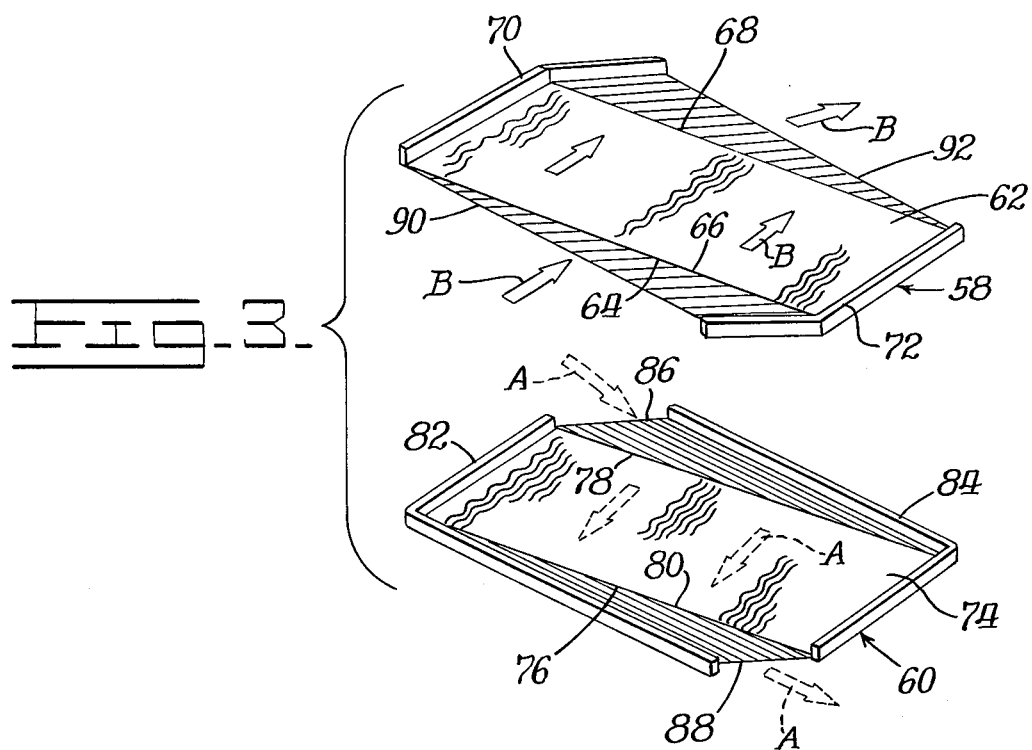
FIG. 3 is an exploded isometric view of a representative pair of adjacent plate assemblies which make up each heat exchanger unit showing the generally alternating fluid flow paths therebetween.

As may be best visualized by reference to FIG. 3, the location of the apertures 86, 88, 90 and 92 serve to provide highly desirable counter-directional flow paths for the respective fluids as they travel across the central rectangular areas 64 and 76 of the plate assemblies 58 and 60. This may be appreciated by comparing the alternatingly associated straight-through flow pattern of the gas as represented by the arrows B with the highly desirable, Z-shaped flow pattern of the air as represented by the arrows A. It is significant to note that the corrugations of the sheets 62 and 74 serve not only the purpose of structurally supporting the heat exchanger plate assemblies in a relatively rigid stack, but also to improve the overall effectiveness of the heat exchanger units by aiding in flow control. Such characteristics are discussed in the aforementioned U.S. Pat. No. 3,759,323.

In addition, the heat exchanger system and ducting arrangement 10 of the present invention has a relatively compact and intimate relationship with the gas turbine engine 12 on which it is mounted. As respectively shown in FIGS. 1 and 2, the length L and width W of the gas turbine engine generally defines a table-top area. And significantly, the heat exchanger units 52 and 54, the air inlet duct 94, the air outlet manifolds 96, the bifurcated channel and wall member 98, as well as the exhaust conduits 126 are disposed substantially vertically within this table-top area. This is accomplished while maintaining high overall effectiveness, since the heat exchanger units extend longitudinally substantially the full length L of the gas turbine engine. Such increased length of the side-by-side heat exchanger units also permits their individual or collective widths to be decreased, if desired, for more effective and efficient heat transfer purposes. Furthermore, the overall height of the gas turbine engine and heat exchanger units may be lowered because longitudinal distribution of the relatively cool air to the multiplicity of apertures 86 can be accomplished within the identical component of heat exchanger height that is required of the cores 52 and 54.

DESCRIPTION OF THE SECOND EMBODIMENT

Figure 4:
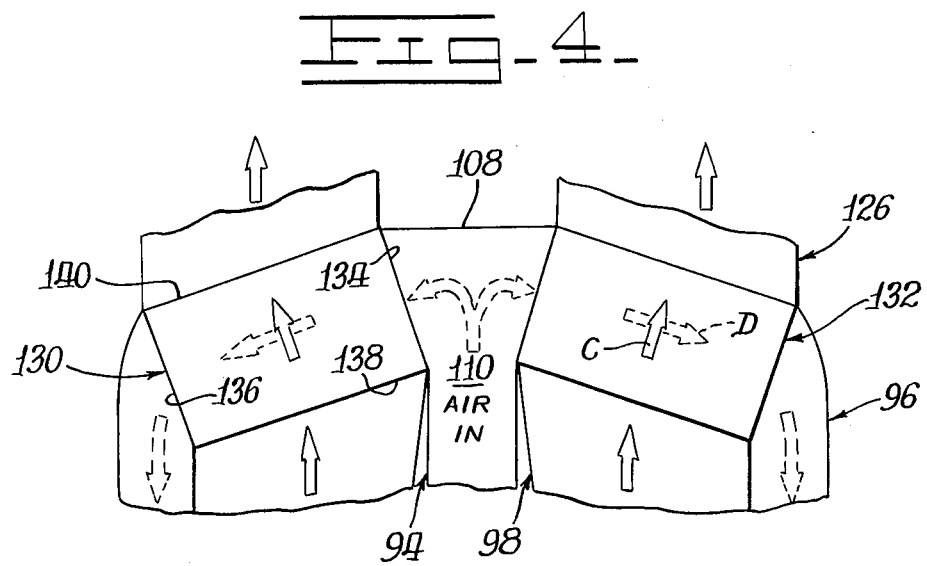
FIG. 4 is a schematically simplified, fragmentary front elevational view of a second embodiment of the heat exchanger system and ducting arrangement of the present invention.

A second embodiment of the heat exchanger system and ducting arrangement 10 of the present invention is schematically illustrated in FIG. 4, wherein similar reference numerals corresponding to the first embodiment have been applied. While a pair of heat exchanger units 130 and 132 are disposed in side-by-side, laterally spaced relation like the first embodiment, they are individually rectangularly shaped in transverse cross section. Such cross section allows air ingress and egress respectively along a pair of opposite side surfaces 134 and 136 across each of the heat exchanger units via a plurality of opposite apertures (not shown) similar to apertures 86 and 88 of the preferred embodiment. However, flow of air is relatively straight through the units because the alternating plate assemblies (not shown) differ from the plate assemblies 58 and 60 of the first embodiment by the elimination of the triangularly-shaped zones 78 and 80. Flow of gas is likewise relatively straight through each of the second embodiment heat exchanger units from a lower surface 138 to an upper surface 140. Thus, the gas flow path through each heat exchanger unit as represented by the solid line arrow identified by the letter C is substantially at a right angle to the air flow path represented by the broken line arrow identified by the letter D to thereby define a cross flow heat exchanger arrangement. Although being generally less effective from a performance standpoint when compared to the first embodiment, such construction is relatively economical and may be very desirable since the feature of a centrally disposed air inlet plenum 110 is still retained to achieve overall compactness.

It is thus apparent that the heat exchanger system and ducting arrangement of the present invention is particularly adaptable for intimate mounting on an engine. Further, the overall height of such combination is less, so that a compact and economical package is presented by utilizing a pair of substantially full length, side-by-side heat exchanger units with an air inlet plenum between them. Advantageously also, the heat exchanger system and ducting arrangement of the present invention is generally disposed vertically within the table-top area of the gas turbine engine.

While the invention has been described and shown with particular reference to a first and second embodiment, it will be apparent that other variations are possible such as supporting two pair of side-by-side heat exchanger units of the character described on a relatively large gas turbine engine. Such other variations would clearly fall within the scope of the present invention, which is not intended to be limited except as defined in the following claims.

What is claimed is:

1. A heat exchanger system and ducting arrangement therefor for transferring heat from a first fluid emanating from a first passage to a second fluid emanating from a second passage and circulating therethrough, comprising:

pair of longitudinally oriented and side-by-side heat exchanger units individually having a plurality of first and second primary surface heat exchanging plate assemblies alternately arranged in a generally upright, transversely oriented and longitudinally stacked manner and defining a plurality of first fluid flow paths and a plurality of second fluid flow paths alternately therethrough and so constructed and arranged that an elongated space is defined between said units for substantially the full length thereof:

a bifurcated inlet duct for delivering the first fluid upwardly from said first passage to said heat exchanger units and said first fluid flow paths, and including a pair of longitudinally extending channels individually connected upwardly to said heat exchanger units;

a pair of exhaust conduits for conducting the first fluid upwardly away from said heat exchanger units after heat is extracted therefrom;

a common inlet plenum including a cover spanning between said heat exchanger units generally above said elongated space, a pair of end walls spanning between the ends of the heat exchanger units, and a centrally disposed duct connected to the heat exchanger units, said centrally disposed duct being longitudinally interposed between said channels and of a construction sufficient for delivering the second fluid oppositely from said second passage upwardly to said elongated space and therefrom in two separate directions symmetrically oppositely outwardly to said heat exchanger units and to said second fluid flow paths; and a pair of outlet manifolds for conducting the heated second fluid from said heat exchanger units.

2. The heat exchanger system and ducting arrangement of claim 16 wherein said heat exchanger units are disposed in laterally spaced relation on the opposite sides of a vertical plane passing through the center of said elongated space, and wherein said centrally disposed duct of said inlet plenum is substantially symmetrically arranged with respect to said vertical plane.

* * * * *